United States Patent Office 3,490,180
Patented Jan. 20, 1970

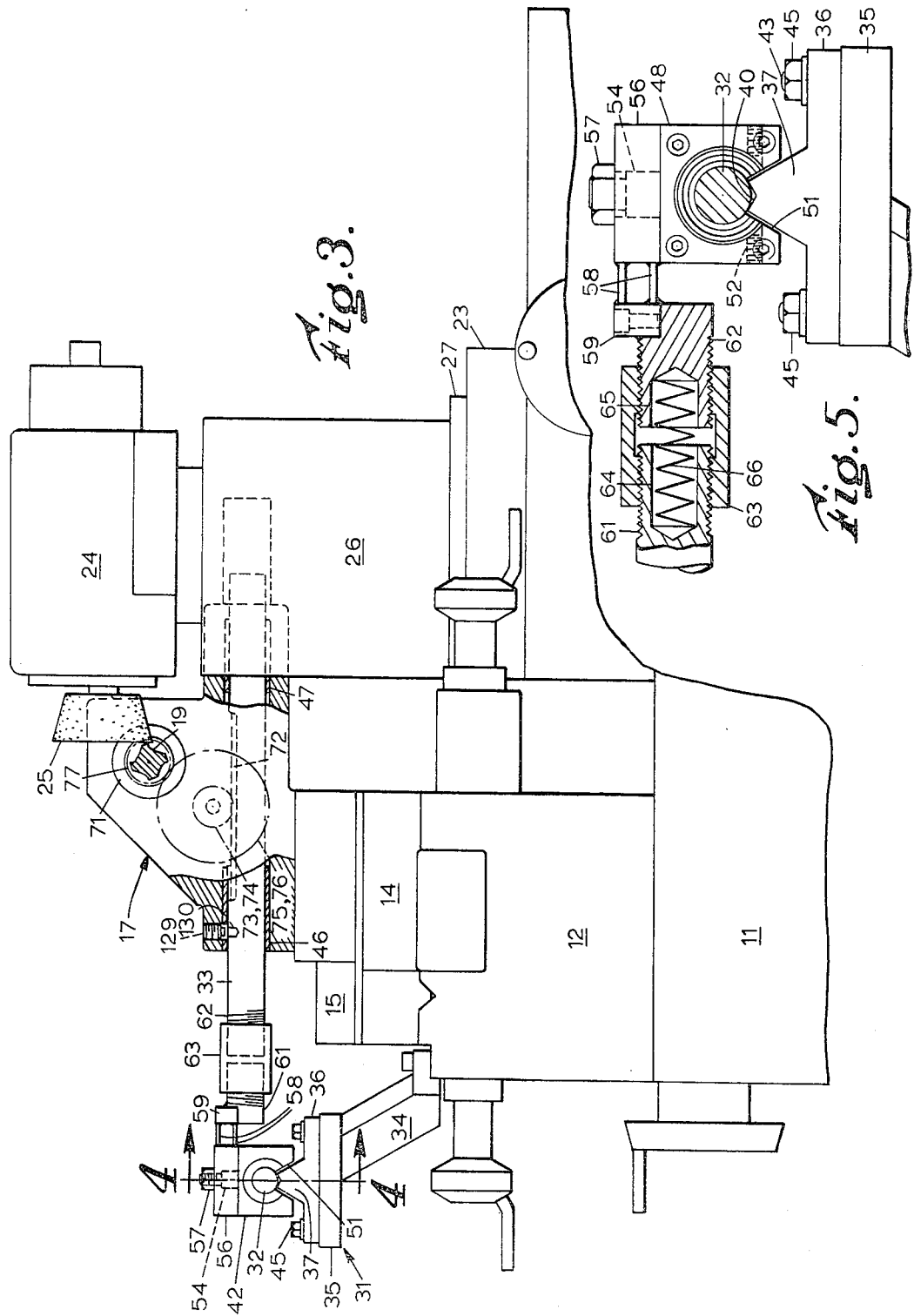

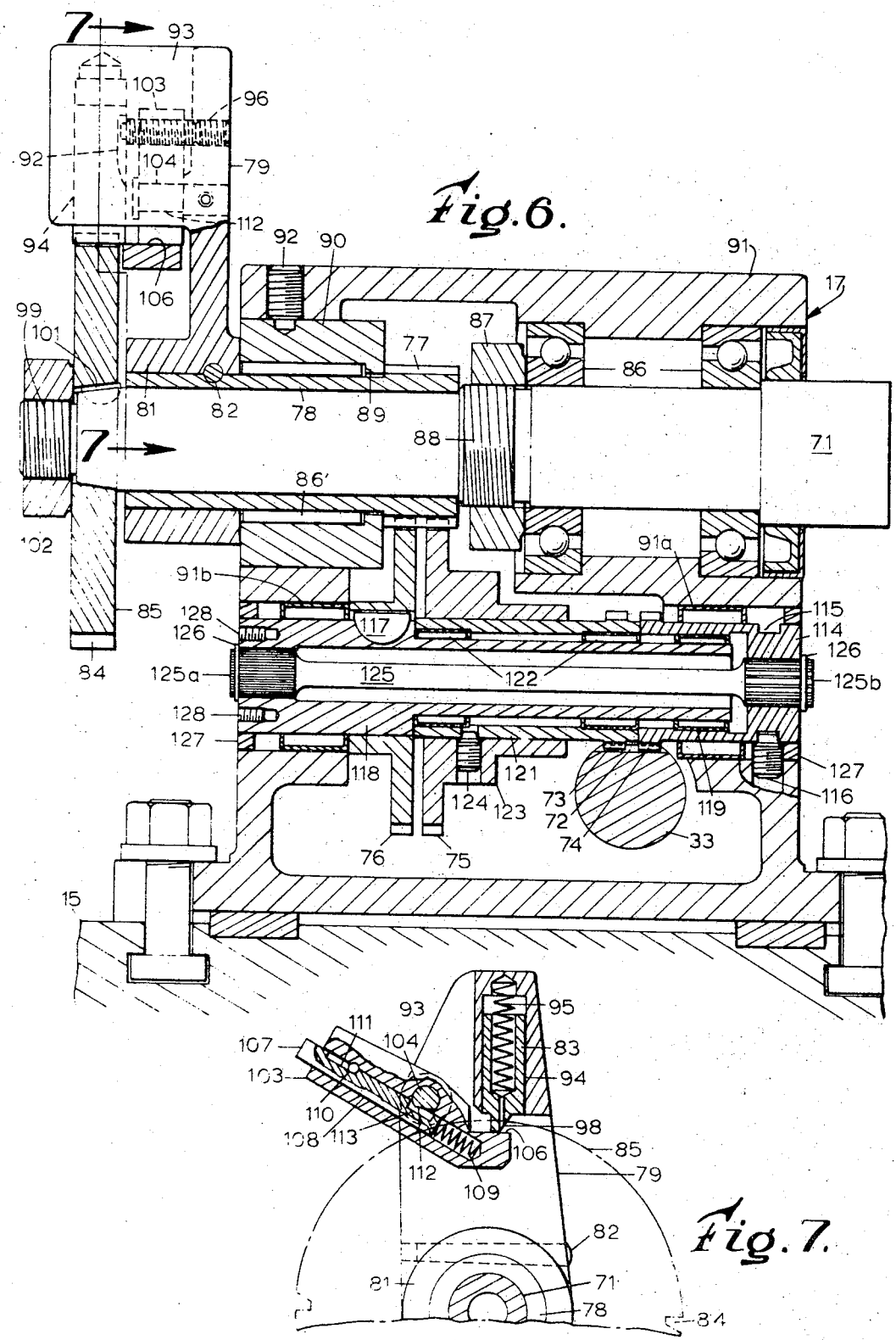

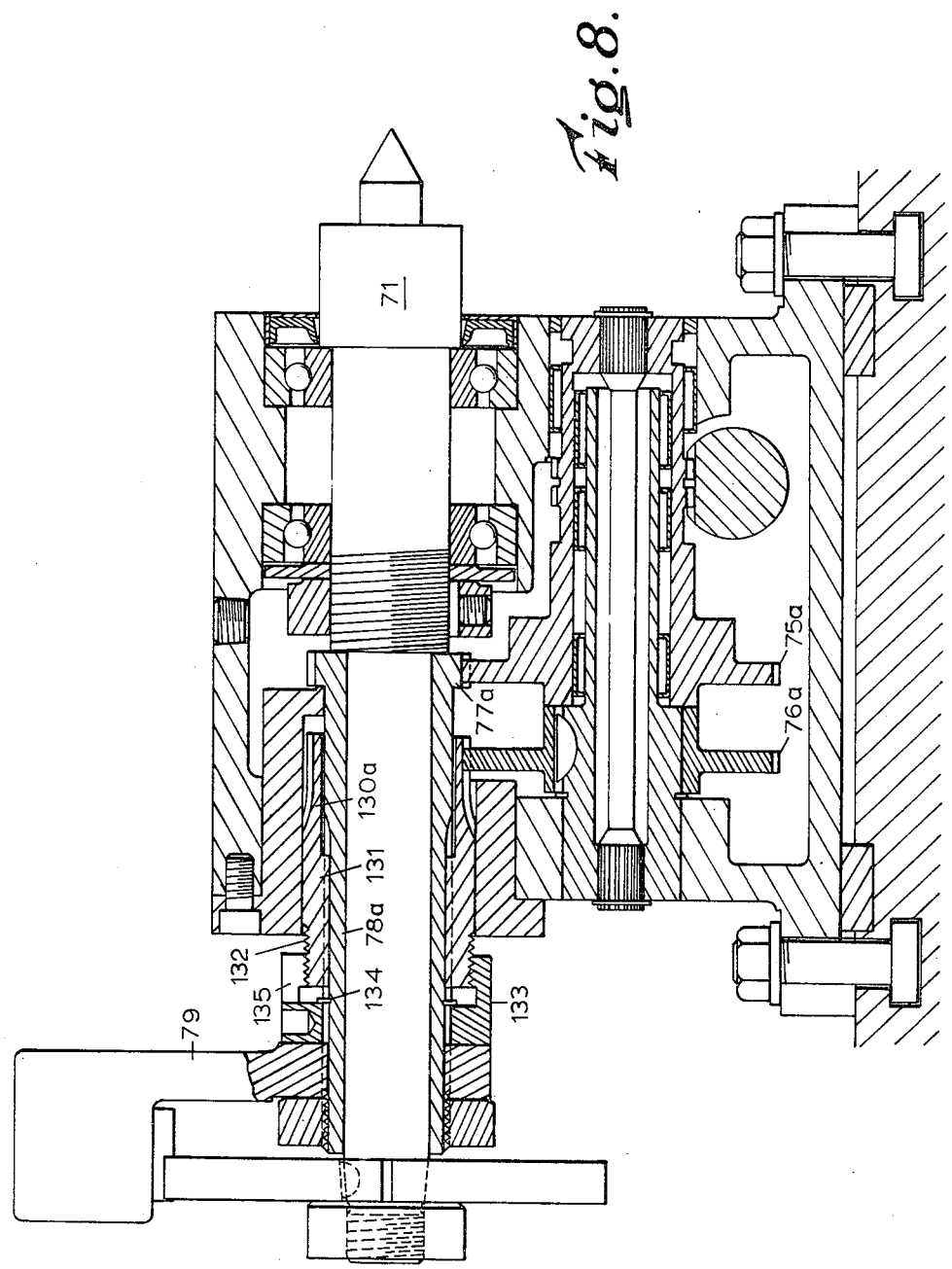

3,490,180
CUTTER GRINDER WITH BACKLASH
PREVENTING MEANS
William J. Jackson, Tamworth, England, assignor to The
Cincinnati Milling Machine Co., Cincinnati, Ohio, a
corporation of Ohio
Filed Oct. 25, 1966, Ser. No. 589,359
Claims priority, application Great Britain, Oct. 26, 1965,
45,358/65
Int. Cl. B24b 3/00
U.S. Cl. 51—123                                8 Claims

ABSTRACT OF THE DISCLOSURE

A grinding machine for cutters wherein the cutter is mounted upon a movable table and rotated in relation to its movement post the grinder by means of a sine bar. A gearing means is connected between the sine bar and rotatable support and includes a preloaded torsion bar to eliminate the backlash between the gears.

---

Figure 1:
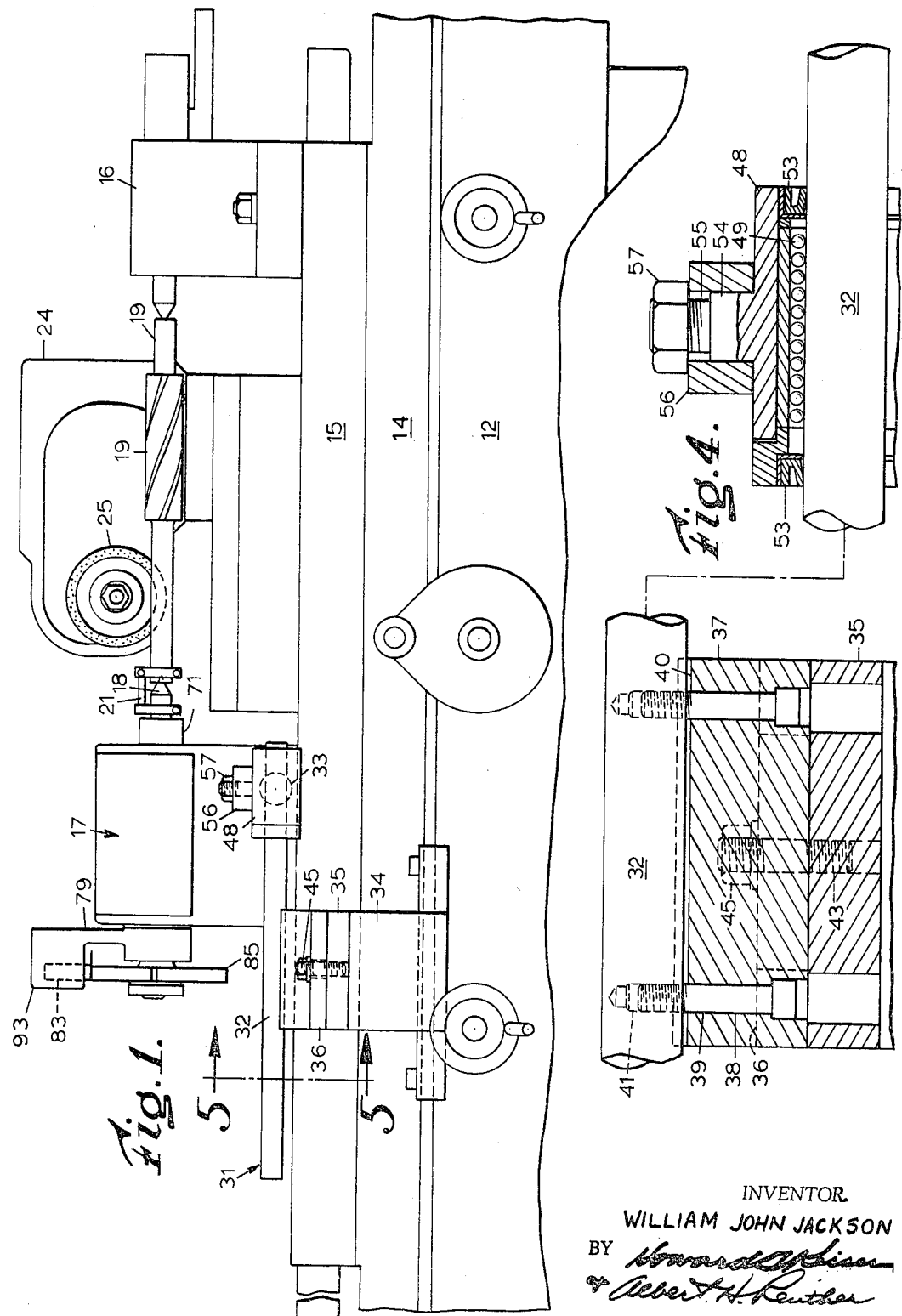

This invention is concerned with gearing mechanisms and has for its main object to provide mechanisms in which backlash between relatively rotatable components is substantially or wholly eliminated.

An example of a gear mechanism in which backlash needs to be eliminated is that of a cutter grinding machine of the kind provided with means for imparting to the cutter a rotary motion that is proportional to straight-line movement of the table on which the cutter is carried, thereby to generate a constant helix during grinding. The type of cutter rotating means most commonly employed is one in which the cutter supporting spindle is rotated by means of a bar, a so-called "sine bar," which can be swivelled in relation to the bed of the machine, thereby to enable an infinite number of helix angle settings to be obtained. The presence of backlash inherent in such a mechanism means that the cutter during the return stroke is at a different angle relative to the grinding wheel to what it is during the forward stroke.

Another object of this invention is therefore to provide a cutter support head with an associated sine bar attachment for a cutter grinding machine, in which backlash is substantially or wholly eliminated. Accordingly the invention provides in another aspect a grinding machine comprising machine bed, a grinding wheel carried on the machine bed for grinding a cutter, cutter support means including a spindle, table means which is carried by the machine bed and on which the cutter support means is mounted, a sine bar cutter grinder attachment comprising a sine bar carried by the machine bed, a motion bar operably connected to the sine bar and connecting the motion bar to the spindle to rotate the latter, a gearing mehanism as set out above.

Backlash is eliminated in the two gear contact points by provision of a torsion bar which is preset to a certain value during assembly. This value is sufficient to retain gear contact during movement in both directions under the action of the grinding forces normally encountered in this type of work.

The usual practice when grinding helical cutters is for the cutter to be held against a tooth rest, this tooth rest being engaged with a tooth other than the one being ground and the cutter being held against this tooth rest manually or automatically.

The improved backlash-free mechanism provided for a cutter grinder by the present invention permits of the grinding of a helical cutter without using a cutter tooth rest. As already intimated its purpose is to impart to the cutter a rotary motion that is proportional to the table movement, the elimination of backlash being essential to retain the cutter-grinding wheel relationship whichever direction the table is moving.

As in known sine bar attachments a bar is used that can be swivelled to a required angular setting and then fixed rigidly to the bed of the machine, the set angle between the bar and the table movement providing the required ratio of cutter rotation—table movement. In the arrangement of cutter head with associated sine bar attachment hereinafter more particularly described, a slide is carried on the swivel-mounted sine bar to impart a cross movement at right angles to the table motion; the cross movement in the construction described is adapted to impart rotary motion to a gear mechanism which has a ratio of 2:1, which enables leads down to say 4" to be accommodated with the bar at an angle of some 30°.

Preferably use is made of a so-called recirculating open-type ball bushing (which can be preloaded) on the sine bar attachement to eliminate a further source of backlash and also to reduce the effort required to operate the attachment.

It is also necessary for the cutter mounting to be capable of being indexed to enable the appropriate tooth to be offered to the grinding wheel, and these indexing means also contribute to the presence of backlash in the mechanism. Provision is made in the apparatus to be described to eliminate substantially, or wholly this backlash. Provision is made for the cutter to be indexed, simply by withdrawing a latch from engagement with an index plate, whereupon the spindle and cutter can be rotated by hand.

Two embodiments of the invention will now be described by way of example with reference to the accompanying drawings.

Figure 2:
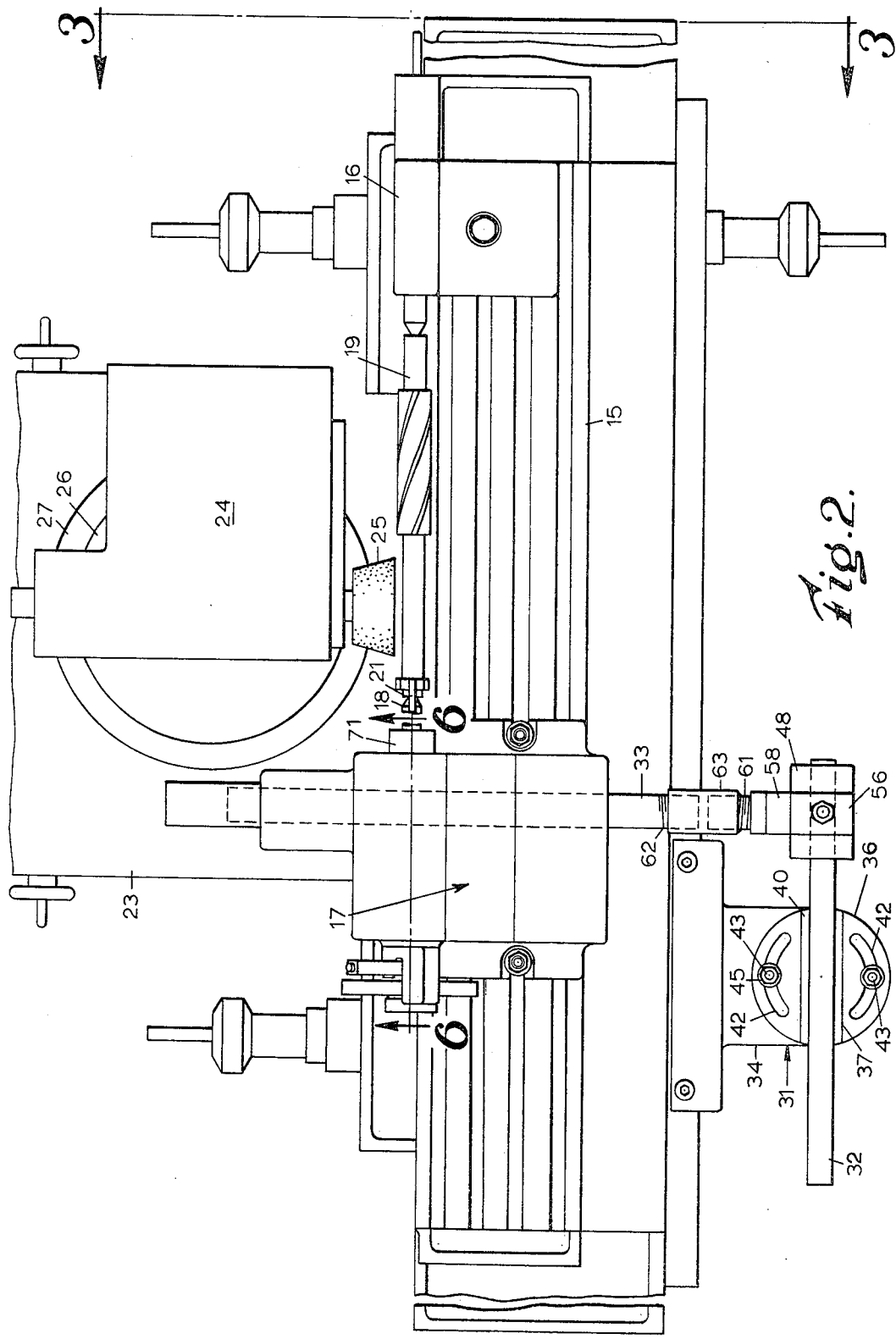

In the drawings:

FIGURE 1 is a front elevation of a cutter grinding machine embodying the invention, FIGURE 2 is a plan view of the machine of FIGURE 1, FIGURE 3 is a view in the direction of arrow 3 in FIGURE 2, FIGURE 4 is a fragmentary section on line 4—4 of FIGURE 3, FIGURE 5 is a view in the direction of arrow 5 in FIGURE 2, the view being partially in section on line 5—5 of FIGURE 2, FIGURE 6 is a sectional view on line 6—6 of FIGURE 2, FIGURE 7 is a part sectional view on line 7—7 of FIGURE 6, and FIGURE 8 is a view similar to FIGURE 6 of a modification of the invention.

Reference is now made to the drawings.

GENERAL ARRANGEMENT

The cutter grinding machine as shown in FIGURES 1, 2 and 3 comprises a bed 11 carrying a bridge 12 on which a slide table 14 is linearly movable. A swivel table 15 is mounted on the slide table 14 so as to be angularly adjustable relative thereto. The swivel table 15 comprises a tail stock 16 and a cutter support head indicated generally at 17, a spindle (described later) which terminates in a head stock centre 18. A cutter 19 to be ground by the machine is carried between the head stock centre 18 and the tail stock 16. A clamp 21 is provided to clamp the spindle to the cutter 19 so that the latter will rotate therewith. It will be appreciated however that the cutter 19 could be mounted in any other convenient known way for rotation with the spindle for example the spindle may have a female taper which receives an end of the cutter 19.

Also mounted on the bed 11 is a saddle 22 (see FIGURE 3) which is capable of moving towards and away from the cutter 19. This saddle 22 carries a wheel head 24 for driving a suitable grinding wheel 25. The wheel head 24 is, in fact mounted on a swivel plate 23 on a column 26 that is received within a sleeve 27 carried by the saddle 22. The column 26 is vertically slidable within the sleeve 27 and the swivel plate is capable of allowing the wheel head 24 to rotate so that the wheel head may swivel in a horizontal plane. Further the wheel head 24 may be mounted upon a bracket (not shown) which permits of a certain degree of angular movement in the vertical plane. The longitudinal movement of the saddle 22 as well as the vertical movement of the column 26 is under control of appropriate hand wheels. The machine as above described in conventional.

THE SINE BAR ATTACHMENT

The machine carries a sine bar attachment 31 which comprises a sine bar 32 connected to a motion bar 33.

THE SINE BAR 32

The sine bar 32 is carried on a bracket 34 that is bolted to the bridge 12. This bracket 34 has a horizontal platform 35 which is circular in plan and on which is received a swivel plate 36. The swivel plate 36 has a diametral triangular ridge 37 the upper edge of which has a re-entrant V-groove 40 (see FIGURES 3 and 5) in which the sine bar 32 seats. Bolts 38 (see FIGURE 4) passing through bolt holes 39 in the swivel plate 36 are screwed into tapped holes 41 in the sine bar 32 to fix the latter securely to the swivel plate 36. The swivel plate 36 is provided with a pair of diametrically opposed arcuate slots 42 through each of which passes a stud 43 secured to the platform 35. The upper ends of the studs 43 receive nuts 45 which may be released to allow the swivel plate 36 to pivot relative to the platform 35 and which may then be tightened to secure the former firmly in position relative to the platform.

In the drawings the sine bar 32 is shown lying parallel to the axis of the cutter 19. However it will be appreciated that in use when grinding a helical tooth on the cutter the sine bar will be inclined at a pre-set angle to the axis of the cutter 19.

THE MOTION BAR 33

The motion bar 33 is axially slidable in bearings 46 and 47 in the cutter head 17. Thus when the table 15 together with the cutter support head 17 moves along the axis of the machine, the motion bar 33 will continue to lie transversely to the table 14 axis. The motion bar 33 is connected to the slide bar 32 by means of a carriage housing 48 which incorporates a recirculating ball bushing 49 (see FIGURE 4). The housing 48 has a triangular cut-out 51 (best seen in FIGURES 3 and 5) to enable it (the housing 48) to slide over the part of the sine bar 32 lying on the ridge 37 of the swivel plate 36. Transverse screws 52 are provided to eliminate play in the recirculating ball bushing unit 49. Seals 53 (see FIGURE 4) are provided at each end of the unit to prevent substantial ingress of dirt.

On its upper face the housing 48 is provided with an upstanding boss 54 carrying a stud 55. An apertured connector plate 56 receives the boss 54 within its aperture so as to be angularly adjustable relative to the housing 48. A nut 57 engages the stud 55 to clamp the connector 56 in position relative to the housing 48. A pair of horizontal flexible plates 58 (best shown in FIGURE 5) are welded to the connector plate 56 and to a connector 59 that is secured to the end of the motion bar 33. This end of the motion bar 33 is split and provided with oppositely handed threads 61 and 62 which are engaged by a turnbuckle 63 to enable the rotary position of the cutter 19 to be adjusted relative to the sine bar 32 for setting purposes. In order to eliminate backlash in the assembly, the end portions of the motion bar 33 have blind bores 64, 65 which receive an enclosed compression spring 66.

When the sine bar is being set up in its angular position, it will be appreciated that the nut 57 is loosened so that the plate 56 can pivot about the boss 54 and the connector or motion bar 33 can take up the correct angular position relative to the sine bar 32. It will also be seen that as the cutter assembly moves along the bridge 12 because the sine bar 32 is in its inclined position, the motion bar 33 will be caused to move axially i.e. transversely to the support head assembly 17. This movement of the motion bar 33 causes a rotary motion of the cutter 19 through the gear system within the cutter support head assembly 17 as will be described.

THE CUTTER SUPPORT HEAD ASSEMBLY (FIGURE 6)

The cutter support head spindle 71 is connected to the motion bar 33 as follows. Between the bearings 46 and 47 the motion bar 33 has rack teeth 72 cut into its upper surface to form a primary input gear. A pair of intermediate pinions 73, 74 engage the rack teeth 72 and are drivably connected with further intermediate pinions 75, 76 respectively as will be described. The pinions 75, 76 engage a primary output pinion 77 formed on a bushing 78 rotatably mounted on the spindle 71. An arm 79 has a boss 81 encircling the bushing 78 and keyed thereto by a transverse tapered pin 82 to be rotatable with the bushing 78. The arm 79 carries a plunger 83 that engages in one of a number of recesses 84 in an indexing plate 85 which is keyed to the spindle 71. The arm 79, plunger 83 and indexing plate 85 form an indexing device which will be described below.

The spindle 71 is rotatably mounted in bearings 86 and 86' and is axially located by means of a nut 87 threaded on to a threaded part 88 of the spindle 71 and engaging the inner race of one of the bearings 86. The bushing 78 is axially located by means of an inwardly directed lip 89 on a bush 90 fixed to the cutter head housing 91 by a screw 92.

The pitch diameter of the pinions 75 and 76 is twice that of the pinion 77. Thus the spindle 71 and hence the cutter 19 will turn through twice the angle for a movement of the motion bar 33 than if the pinions 77 and 75, 76 were of the same pitch diameter.

THE INDEXING DEVICE (FIGURE 7)

The arm 79 is also provided at its free end with an enlarged head 93 formed with a radially extending blind bore 94 that receives the hollow plunger 83. A compression spring 95 within the bore 94 urges the plunger downwardly. A threaded pin 96 (see FIGURE 6) engages in a slot 97 in one end or one side of the plunger 83 to prevent the latter being forced out of the bore 94. The plunger 83 which is wider than the indexing plate 85 has a tapered nose 98 that fits firmly into the indexing plate recesses 84 to prevent backlash when setting up the cutter.

The outer end of the spindle 71 has a conical portion which terminates in a threaded end portion 99. The indexing plate 85 has a frustoconical central aperture which fits over the conical portion. A key 101 key the indexing plate 85 to the spindle 71 and a nut 102 urges the indexing plate 85 hard up against the spindle.

The arm 79 also carries a plunger retracting lever member 103 which is pivoted on a pin 104 carried by the arm 79. The member 103 has a ledge 106 that can engage the end of the plunger nose 98 projecting beyond the indexing plate 85. This member 103 has an internal locking mechanism to enable an operator to hold the plunger 83 out of engagement with the indexing plate 85. This locking mechanism comprises a pin 107 slidable within an internal bore 108 against the influence of a spring 109 and being limited as to its axial travel by means of a pin 110 in the member 103 engaging in a short slot 111. The pivot pin 104 has a flat surface 112 which is opposite a slot 113 in the member 107 when the member 103 is in its inoperative position as shown in FIGURE 7. When the member 103 pivots about the pin 104 to lift the plunger nose 98 out of engagement with a recess 84, the operator can press in the pin 107 so that a portion of the pin 107 spaced from the recess 113 comes opposite the flat 112 and locks the member against rotation. The operator now has both hands free for rotating the spindle and cutter. After the operator has indexed the spindle suitably, he can manipulate the member 103 so that the pin 107 is moved by the spring 109 to allow the recess 113 to be opposite the pin 104 so that the member 103 can rotate freely and allow the plunger to return to its position engaging a recess 84.

THE BACKLASH PREVENTING DEVICE

The pinion 74, which engages the rack 72 is formed at the inner end of a sleeve 114. This sleeve 114 is journalled in bearings 91a and 91b in the housing body 91 and is provided with an annular recess 115 which is engaged by a pin 116 screwed into the housing. This pin 116 locates the sleeve 114 axially in the cutter head housing 91. The pinion 76 which engages the gear wheel 77 is connected by means of a key 117 to an elongated hollow sleeve 118 which is journalled in an aligned aperture in the opposite wall of the cutter head housing 91. The inner end of the hollow sleeve 118 is journalled at 119 within the sleeve 114.

The pinion 73 that also engages the rack 72 is formed on an end of a bush 121 which is rotatable in bearings 122 on the sleeve 118 and which is connected to a boss 123 on which the pinion 75 is formed by means of a radial screw 124.

A torsion bar 125 is splined at its end 125a and 125b respectively to the outer ends of the sleeves 118 and 114. Axial movement of the torsion bar 125 is limited by circlips 126.

The appropriate seals 127 are provided to seal the various ends of the units.

The torsion bar 125 is pre-loaded as follows. The pinion 77 is withdrawn from engagement with pinions 75 and 76. A screw 129 in the cutter head housing 91 engages a hole 130 in the motion bar 33 to lock the latter in position. A weight (not shown) is then applied to an arm that is secured to the sleeve 118 by means of holes 128. When the appropriate tension has been applied the gear teeth 77 are slid back into position to engage the pinions 75 and 76. The number of spline serrations at each end 125a, 125b of the torsion bar are different e.g. end 125a may have 40 serrations and end 125b may have 36 serrations. By this means the angular setting of the pinions 75, 76 may be adjusted prior to the setting up of the internal tension in the torsion bar 125 so that when the latter is tensioned, the teeth of the pinions 75, 76 are aligned to facilitate easy re-assembly with the pinion 77.

Because of the use of the backlash preventing device described above the angular position of the spindle 71 and hence the cutter 19 will remain the same during forward and return movements of the cutter 19 past the grinding wheel 25.

MODIFIED CUTTER SUPPORT HEAD ASSEMBLY (FIGURE 8)

The modified cutter support head assembly is used where light-preloadings are required for example when the cutter being ground has a very small diameter and also for simplifying the application of a pre-load.

In this assembly the parts are generally the same as those described above and will be described only in so far as they differ from the first cutter head housing assembly. In this assembly the larger intermediate gears 75a and 76a are axially spaced from each other and are provided with helical gear teeth of the opposite hand. These gears 75a, 76a, mesh respectively with helical primary gears 77a and 130a. The gear 77a is formed on a flange of a sleeve 78a and is slidable on the spindle 71. The gear 130a is cut on an outer sleeve 131 that is splined on to the sleeve 78a. The free end of the sleeve 131 is threaded at 132 and is engaged by a nut 133 that is held against axial movement relative to the sleeve 78a by the arm 79 and a circlip 134. By rotating the nut 133, the sleeve 131 is moved axially along the sleeve 78a with the consequence that the relative angular position of the teeth of pinion 130a and 76a will change and the angular position of the pinion 75a and 76a will change to vary the pre-load tension in the torsion bar 125.

A part 135 of the nut 133 may be cut away and graduations may be marked on the nut to be used in conjunction with the threaded end of the sleeve 131 to facilitate easy setting of a given pre-load.

It is understood that the specific features referred to herein are for the purpose of illustration only and are not intended to limit the scope of the invention.

Thus for example a pair of parallel sine bars may be provided upon parallel ridges on the swivel plate. These sine bars are received in a double apertured carriage housing to which the motion bar is attached as described above. The carriage housing is provided with openings at its lower end so that it (the carriage housing) can pass over the swivel plate, the ridges at this time passing through the aforesaid openings. Here again a recirculating ball bushing is employed using transverse screws to eliminate play in the unit. It will be appreciated that the various parts must be parallel within very close tolerances. This arrangement provides a very rigid unit.

I claim:
1. In a grinding machine having a machine bed, a grinding wheel carried on the machine bed for grinding a cutter, cutter support means including a spindle, slidable table means which is carried by the machine bed and on which the cutter support means is mounted, a sine bar cutter grinder attachment comprising a sine bar carried by the machine bed, a motion bar operably connected to the sine bar and connecting the motion bar to the spindle to rotate the latter, the combination of a gearing mechanism comprising first and second primary gear means on said cutter support spindle and motion bar respectively, first and second pairs of intermediate gears, each pair meshing respectively with the first and second primary gear means, rigid connecting means non-rotatably connecting one intermediate gear of the first pair of intermediate gears to an intermediate gear of the second pair of intermediate gears, and a preloaded torsion bar the opposite ends of which are connected respectively to the other intermediate gears thereby eliminating backlash between said first and second primary gear means.

2. A machine as claimed in claim 1 wherein the motion bar carries a rack comprising the first primary gear means.

3. A machine as claimed in claim 1 wherein the sine bar has axial support longitudinally along a ridge upstanding from a swivel plate adjustably carried on a machine support bracket.

4. A machine as claimed in claim 1, wherein the sine bar and the motion bar have operable connection transversely therebetween including a carriage adapted to move with the table means, said carriage providing a housing for a recirculating ball bushing unit mounted therewith as well as providing support for a pair of parallel plates to a connector having an end adaptor therewith.

5. A machine as claimed in claim 1 wherein the motion bar has two end parts adjustably connected by a turnbuckle and wherein spring means bias the end parts apart.

6. A machine as claimed in claim 1 further comprising an index plate carried on the spindle at one end of the cutter support means, an index plunger means reciprocally movable into and out of engagement with predetermined locations on said index plate, a drive arm journalled for movement radially of the spindle of said cutter support means and carrying said index plunger means and means connecting the drive arm to the secondary primary gear means for rotation therewith.

7. A machine as claimed in claim 6 wherein said drive arm carries a lever pivotal about a pin axis subject to a spring biased latch controlled movement that effects spring biased index plunger means movement selectively for engagement with said index plate in predetermined positioning thereof, so that hand as well as gear driven spindle movement is possible.

8. A machine as claimed in claim 1 wherein the gear mechanism has gear train ratio of 2:1 that enables leads down to substantially four inches to be accommodated with said sine bar at an angle close to 30°.

References Cited

UNITED STATES PATENTS

| | | | |
|---|---|---|---|
| 2,066,220 | 12/1936 | Orcutt | 51—95 |
| 2,212,855 | 8/1940 | Chittenden | 51—95 |
| 2,401,561 | 6/1946 | Gurenberg | 51—95 |
| 2,692,538 | 10/1954 | Luce | 51—232 X |
| 3,314,197 | 4/1967 | Whitney | 51—232 |

FOREIGN PATENTS 376,791  5/1960  Switzerland.

HAROLD D. WHITEHEAD, Primary Examiner

U.S. Cl. X.R.

51—232; 74—409